United States Patent
Ito et al.

(10) Patent No.: US 7,203,559 B2
(45) Date of Patent: Apr. 10, 2007

(54) METHOD FOR MANUFACTURING SEMICONDUCTOR WAFER, METHOD FOR RECEIVING ORDER FOR MANUFACTURE OF SEMICONDUCTOR WAFER, AND SYSTEM FOR RECEIVING ORDER FOR MANUFACTURE OF SEMICONDUCTOR WAFER

(75) Inventors: Tatsuo Ito, Tokyo (JP); Shigeyoshi Netsu, Fukushima (JP); Masashi Ichikawa, Fukushima (JP); Nobuhiro Ohara, Fukushima (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 175 days.

(21) Appl. No.: 10/502,389

(22) PCT Filed: Jan. 22, 2003

(86) PCT No.: PCT/JP03/00557

§ 371 (c)(1),
(2), (4) Date: Jul. 26, 2004

(87) PCT Pub. No.: WO03/065426

PCT Pub. Date: Aug. 7, 2003

(65) Prior Publication Data

US 2005/0085017 A1 Apr. 21, 2005

(30) Foreign Application Priority Data

Jan. 29, 2002 (JP) ............................. 2002-019334

(51) Int. Cl.
*G06F 19/00* (2006.01)

(52) U.S. Cl. ........................................ 700/97; 700/117

(58) Field of Classification Search ............ 700/95–97, 700/117–121; 705/7–10, 26
See application file for complete search history.

(56) References Cited

U.S. PATENT DOCUMENTS 3,671,748 A * 6/1972 Friedman .................... 250/548

(Continued)

FOREIGN PATENT DOCUMENTS

JP A 4-73925 3/1992

(Continued)

*Primary Examiner*—M. N. Von Buhr
(74) *Attorney, Agent, or Firm*—Oliff & Berridge, PLC (57) ABSTRACT

The present invention provides a method for manufacturing a semiconductor wafer comprising steps of obtaining information of a device manufacturing process, selecting a wafer manufacturing process corresponding thereto, and manufacturing a semiconductor wafer according to the selected wafer manufacturing process. The present invention also provides a method for receiving an order for manufacture of a semiconductor wafer comprising a step of connecting a device maker with a customer computer in a wafer maker, a step wherein the customer computer receives information of a device manufacturing process and a step of selecting a wafer manufacturing process corresponding thereto, and provides a system for receiving an order for manufacture of a semiconductor wafer comprising a client terminal in a device maker and a customer computer in a wafer maker wherein information of a device manufacturing process is inputted into the client terminal and is sent, the customer computer receives the information of the device manufacturing process, and a wafer manufacturing process corresponding thereto is selected. Thereby, there can be provided a method for manufacturing a semiconductor wafer, a method for receiving an order for manufacture of a semiconductor wafer, and a system for receiving an order wherein a wafer suitable for a device manufacturing process in a device maker is supplied.

35 Claims, 6 Drawing Sheets

U.S. PATENT DOCUMENTS

| | | | |
|---|---|---|---|
| 5,993,493 A * | 11/1999 | Takamizawa et al. | 29/25.01 |
| 6,110,213 A * | 8/2000 | Vinciarelli et al. | 703/1 |
| 6,336,056 B1 * | 1/2002 | Fujimoto et al. | 700/121 |
| 6,704,093 B2 * | 3/2004 | Kurosawa | 355/53 |
| 6,725,122 B2 * | 4/2004 | Mori et al. | 700/121 |
| 6,760,640 B2 * | 7/2004 | Suttile et al. | 700/121 |
| 6,801,826 B2 * | 10/2004 | Tanabe | 700/121 |
| 6,996,450 B2 * | 2/2006 | Suttile et al. | 700/121 |
| 2002/0004686 A1 * | 1/2002 | Chiba | 700/97 |
| 2002/0013930 A1 * | 1/2002 | Inanami et al. | 716/1 |
| 2002/0032493 A1 * | 3/2002 | Kadowaki et al. | 700/97 |
| 2002/0124228 A1 * | 9/2002 | Madni | 716/1 |
| 2002/0138404 A1 * | 9/2002 | Akiyama et al. | 705/37 |
| 2002/0143424 A1 * | 10/2002 | Mori et al. | 700/121 |
| 2002/0143656 A1 * | 10/2002 | Matsuo et al. | 705/26 |
| 2002/0161665 A1 * | 10/2002 | Aoyama et al. | 705/26 |
| 2003/0036971 A1 * | 2/2003 | Tanabe | 705/26 |
| 2005/0240892 A1 * | 10/2005 | Broberg et al. | 716/11 |
| 2005/0246049 A1 * | 11/2005 | Suttile et al. | 700/117 |

FOREIGN PATENT DOCUMENTS

| | | | |
|---|---|---|---|
| JP | A 11-345750 | | 12/1999 |
| JP | A 2002-24634 | | 1/2002 |
| JP | 2002-110518 A | * | 4/2002 |
| JP | WO 02/41380 A1 | | 5/2002 |

\* cited by examiner

Connect with Customer computer of Wafer maker.

Please input Customer code.

Device maker X

Please input General specification.

☐ Spec. No. Input : _______________________

☐ Individual specification input ⟶ Transfer to Details Input Screen

Quantity _______  Desired time of delivery _______________

Next page

Fig. 4

Device maker X

○ Input of Information of Device Manufacturing Process 1
Please select Production line for use from below ☐ Use of Current Production line ☐ Use of New Production line

[Next page]

Fig. 5

Device maker X

○ Input of Information of Device Manufacturing Process 2
Please input Details of Process Information.

① ________________________

② ________________________

③ ________________________

[Next page]

Fig. 6

Device maker X

Your order is confirmed.

We will supply wafers with
 A XX~XX μm
 B XX~XX μm
 C XX~XX μm
in our recommended quality (ABC parameter).

Time of delivery is XX/XX.

OK?    | OK |  | CANCEL |

METHOD FOR MANUFACTURING SEMICONDUCTOR WAFER, METHOD FOR RECEIVING ORDER FOR MANUFACTURE OF SEMICONDUCTOR WAFER, AND SYSTEM FOR RECEIVING ORDER FOR MANUFACTURE OF SEMICONDUCTOR WAFER

TECHNICAL FIELD

The present invention relates to a method for manufacturing a semiconductor wafer, a method for receiving an order for manufacture of a semiconductor wafer, and a system for receiving an order between a wafer maker and a device maker. In particular, it relates to a method for providing a wafer which is suitable for each device manufacturing process in a device maker.

BACKGROUND TECHNOLOGY

The conventional manufacturers of a semiconductor product are roughly divided into a wafer maker which manufactures a semiconductor wafer to be used as a substrate, and a device maker which forms various devices such as a memory on this wafer.

A wafer maker receives a product specification from a device maker, pulls a single crystal ingot according to the specification, slices the single crystal ingot, and conducts wafer processing in which at least one main surface is subjected to mirror polishing, other heat treatments, or the like, to produce semiconductor wafers, and then supplies (sells) them to the device maker.

The device maker forms a device on the wafer supplied by (purchased from) the wafer maker using an aligner such as a stepper, and manufactures and sells semiconductor products such as a DRAM and a flash memory.

A general specifications ordered by a device maker to a wafer maker comprises, for example, quantity, time of delivery, properties of an ingot and a wafer (a diameter of a wafer, a conductivity type, resistivity, oxygen concentration, flatness), or the like.

In the present circumstance, a wafer is manufactured and supplied by a wafer maker according to a specification required by a device maker. Even if it is suited to the required specification (even if it is within a standard), a problem that a yield or the like gets worse has occurred in a device maker.

The reason thereof is considered to be that with a tendency to high integration of a device or the like, a margin of a process has been decreased and a wafer quality higher than the required specification is sometimes demanded, and the quality which is not in the specification may have influence.

Conventionally, it can be evaluated whether a wafer produced based on the required specification in the present circumstance has sufficient compatibility to an apparatus or not by this. If the compatibility is bad, the wafer is evaluated to be bad. Even if the wafer maker improves a generally required specification such as flatness, it has been tended to be bad.

Then, the wafer maker itself has devised the wafer manufacturing process, and has matched it for each device maker. For this reason, wafer production lines (conditions for manufacturing a wafer) of various processes have been made.

Moreover, problems such as a yield may also be caused by difference in the production line on the side of a device maker, especially by variation of characteristics of apparatus to be used, or the like.

Therefore, even though the wafer is matched on the wafer maker's side, matching may become worse when the device manufacturing process on the side of the device maker, especially the apparatus to be used or the like is changed. As described above, a really desirable wafer has not been supplied only with response on the side of a device maker.

Accordingly, it has become difficult to supply a wafer stably, unless a wafer maker manufactures a wafer with considering manufacture conditions or the like on the side of a device maker. Moreover, it has become also necessary for a wafer maker to respond quickly to a change of a device manufacturing process in the device maker.

DISCLOSURE OF THE INVENTION

The present invention has been made in order to solve such problems. Its object is to provide a method for manufacturing a semiconductor wafer wherein a wafer suitable for a device manufacturing process on the side of a device maker is appropriately supplied, a method for receiving an order in manufacture of a semiconductor wafer and a system for receiving an order.

To achieve the above mentioned object, the present invention provides a method for manufacturing a semiconductor wafer comprising steps of, at least, obtaining information of a device manufacturing process as for a device manufacturing process, analyzing the above-mentioned information of the device manufacturing process and selecting a wafer manufacturing process which can manufacture a semiconductor wafer having wafer characteristics corresponding to the above-mentioned information of the device manufacturing process, and manufacturing a semiconductor wafer according to the selected wafer manufacturing process.

As described above, the manufacture method of the present invention is characterized in that a wafer which has wafer characteristics suited to each process on the side of a device maker is manufactured and supplied using information of a device manufacturing process on the side of a device maker. Conventionally, a wafer has been manufactured and supplied only with a general specification. According to the present invention, not only the specification but process information on the side of a device maker is used, and a wafer suitable for the process (an individual process) is manufactured and supplied.

A few wafers can be quickly supplied by carrying out such a detailed response. Moreover, on the side of a device maker, the device can be manufactured with a good yield.

In this case, it is preferable that the above-mentioned information of the device manufacturing process includes information as for an apparatus used in the above-mentioned device manufacturing process.

A problem in the present circumstance is especially matching between a wafer configuration, particularly a configuration at a periphery part of a wafer and a configuration of a back surface of the wafer, and a manufacturing apparatus, an apparatus for evaluation and measurement, or the like. Accordingly, it is desirable that the information of the device manufacturing process on the side of the device maker is information as for an apparatus used by the device maker. This is because there is a tendency that a yield becomes different from each apparatus in the present circumstance.

As described above, according to the manufacture method of the present invention, since a wafer which is the best for manufacturing a device by a device maker without waste is supplied, wafers suited to characteristics of each apparatus in the device maker can be manufactured and supplied.

In this case, it is preferable that the above-mentioned information as for the apparatus used in the device manufacturing process includes information as for a wafer chuck of the above-mentioned apparatus.

As described above, it is especially desirable that the information of the device manufacturing process on the side of the device maker is information such as a configuration of a chuck of a manufacturing apparatus or the like. Namely, it is information as for a configuration of a chuck for holding a wafer in a manufacturing apparatus which is utilized for an aligner, a dry etching system or the like used in a device process.

For example, tolerance of a stepper used for an aligner to a wafer configuration is very small, and it tends to cause a problem. Therefore, as information as for a wafer chuck, information such as flatness and a configuration of the peripheral part of the chuck at the time of use is effective.

Moreover, since thermal conductivity or the like influences a dry etching process, it is necessary to control temperature. If a state (configuration) of a back surface of a wafer does not match a chuck configuration, calibration of temperature will be needed for each wafer, and productivity will become bad. Therefore, information as for the wafer chuck used in such a process may include a state of a surface of the chuck, for example, a wafer sucking area and a sucking method, and roughness of the surface of the chuck or the like as still more detailed information.

Furthermore, it is preferable that the above-mentioned information of the device manufacturing process includes information expressed with an ABC parameter which consists of a maximum value A, a minimum value B and a standard deviation C of displacement of a reference line in a wafer surface and the wafer surface.

Figure 8:
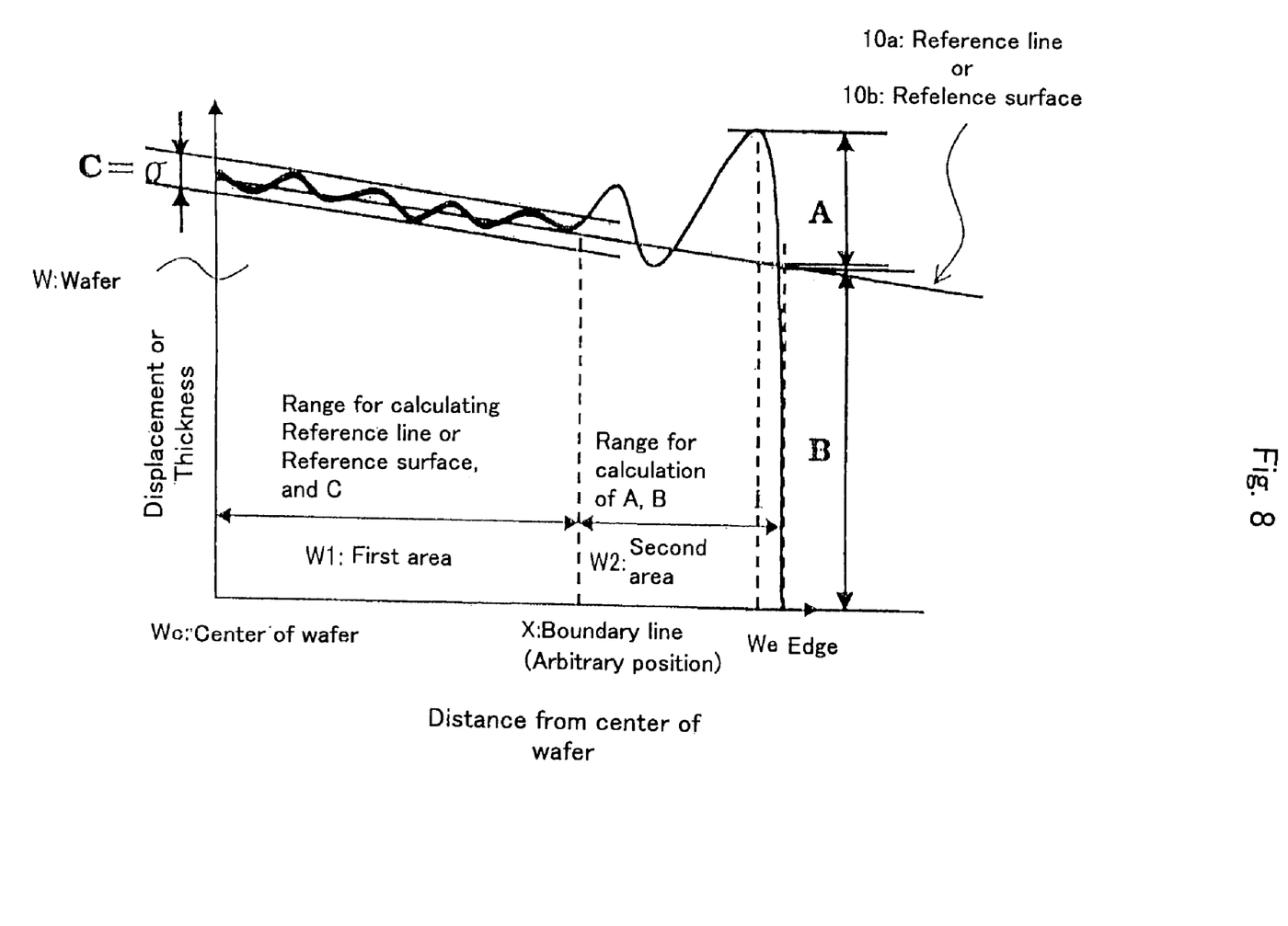
FIG. 8 is an explanatory drawing schematically showing a method for evaluating an ABC parameter.

As shown in Japanese Patent application No. 2000-350151 (WO 02/41380), the ABC parameter is a method of evaluation wherein a wafer configuration (displacement (height, roughness) in a perpendicular direction to a surface of a wafer) is measured at a predetermined interval in a plane of the wafer, the first area for computing a reference line is set in the plane of the wafer as shown in FIG. 8 using the measured wafer configuration, the reference line in the first area is computed, the second area to be evaluated outside the first area is set (it is usually set at a periphery part of the wafer), the above-mentioned reference line is extrapolated to the second area, difference between a configuration of the second area and the reference line in the second area is analyzed, and the value is calculated as a surface characteristic. It is also a evaluation method by regarding a maximum value (positive maximum displacement or positive maximum difference of thickness) of this value as a surface characteristic (rise) A (A parameter), and a minimum value (a negative maximum) as a surface characteristic (sag) B (B parameter). Moreover, in this evaluation method, difference between the reference line and an actual measurement is calculated in the first area, and a standard deviation σ of the difference thereof is regarded as a surface characteristic (waviness) C (C parameter).

Conventionally, flatness of a wafer has been estimated using quality such as SFQR (Site Front least sQuares Range) and GBIR (Global Back-side Ideal Range), and they are included in a general specification. However, a wafer which was fully suited to a device maker could not be supplied by using such quality. The evaluation with the ABC parameter is desirable since it can define a wafer configuration more accurately than the conventional index indicating flatness such as SFQR. In particular, according to the A and B parameter, quality which becomes a problem at a wafer chuck in a stepper or the like can be correctly grasped by evaluating quantitatively a configuration of a periphery part of a wafer such as rise or sag. Moreover, the ABC parameter can be used for evaluation of not only a wafer configuration but a chuck configuration or the like.

As described above, according to the ABC parameter, especially a periphery part of a semiconductor wafer can be evaluated with sufficient precision. Therefore, if information of a device manufacturing process is information expressed with the ABC parameter as for a chuck configuration or an desired wafer configuration, it is especially effective in a lithography process. Such quality information which has not been in a conventional specification is effective.

For example, when a device maker orders a wafer, a wafer maker receives a necessary value of an ABC parameter as information of a device manufacturing process. Moreover, a chuck configuration of an aligner may be analyzed with an ABC parameter, and the information may be obtained as information of a device manufacturing process.

In this case, it is preferable that the above-mentioned information of the device manufacturing process includes information as for at least one process selected from a lithography process, a heat treatment process, a CMP process, and an etching process.

In the present circumstance, a wafer configuration especially becomes a problem, and process information which influences a wafer configuration is useful. However, it is not necessary for the present invention to be limited thereto. For example, information of a device manufacturing process on the side of a device maker may be information as for lithography processes, a heat treatment process, a CMP process, and an etching process in an apparatus other than an aligner and a dry etching apparatus. For example, process information on a heat treatment process may be either information as for a heat treating furnace or other information.

For example, since a gettering capacity or the like is varied with heat treatment conditions in a device manufacturing process on the side of a device maker and types of single crystal ingots manufactured in a wafer manufacturing process on the side of the wafer maker, it is necessary to control finely characteristics of the single crystal ingots or the like manufactured by the wafer maker according to the heat treatment conditions on the side of the device maker. In this case, a wafer maker receives and analyzes a type of a heat treating furnace, a model number, heat treatment conditions or the like as information as for a heat treatment process, controls especially oxygen concentration, nitrogen concentration or the like in a wafer to be manufactured, selects a wafer manufacturing process corresponding to a device manufacturing process, and manufactures a desired wafer.

In this case, it is preferable to further include a step of printing a laser mark corresponding to the above-mentioned information of the device manufacturing process on the above-mentioned semiconductor wafer.

If it is printed as described above, a device maker can also easily grasp into which step a purchased wafer should be put.

Moreover, when supplying wafers suited to each device manufacturing process as described above, only the wafers with appropriate quantity for process capability on the side of a device maker will be supplied, and orders for many types with a comparatively few wafers (for each process) are increased. Then, on the wafer maker's side, it has become necessary to collect information on a device maker and to determine a production line of a semiconductor wafer quickly.

Accordingly, the present invention provides a method for receiving an order for manufacture of a semiconductor wafer which at least comprises a step of connecting a device maker with a customer computer in a wafer maker through a network, a step wherein the above-mentioned customer computer in the wafer maker receives at least information of a device manufacturing process as for a device manufacturing process in the device maker from the above-mentioned device maker through a network, and a step of analyzing the above-mentioned information of the device manufacturing process and selecting a wafer manufacturing process in which a semiconductor wafer having wafer characteristics corresponding to the above-mentioned information of the device manufacturing process can be manufactured.

As described above, the present invention provides a method for receiving an order which is conducted between a wafer maker manufacturing and selling a semiconductor wafer and a device maker manufacturing a device using the semiconductor wafer. A device maker (correctly a person in charge in the device maker or an intermediary) connects a client terminal or the like to a customer computer on the side of the wafer maker, and input a specification for a desired general product and information of a device manufacturing process on the side of the device maker. On the wafer maker's side, the information inputted into the customer computer is analyzed, and a production line comprising the optimal wafer manufacturing process is selected by simulation, and thereby a wafer which has wafer characteristics suited to each process in the device maker can be manufactured and provided.

In order to provide a wafer suitable for the device maker, it is important to collect detailed information and select a wafer production line quickly. According to the above-mentioned method for receiving an order using a computer via a network, information of a device maker can be obtained smoothly, and improvement in service can be achieved. Moreover, the determination of a wafer production line on the side of the wafer maker also becomes easy, and a recommendable wafer further suited to the process on the side of a device maker can be provided.

In this case, it is preferable that the above-mentioned information of the device manufacturing process includes information as for an apparatus used in the device manufacturing process in the above-mentioned device maker.

Although the information of the device manufacturing process on the side of a device maker is not limited, it is preferably information as for an apparatus used in the device maker. It is because there is a tendency that a yield becomes different from each apparatus at the present circumstance and it needs to supply a wafer suitable for each apparatus.

It is especially effective in the case that a wafer used in a current line (generally used) on the side of the device maker is ordered. Moreover, the device maker may only input a model number or the like of an apparatus to be used, and thus it is easy to input.

In this case, it is desirable that the above-mentioned information as for the apparatus used in the device maker includes information as for a wafer chuck of the above-mentioned apparatus.

As described above, it is preferable that the information of the device manufacturing process on the side of the device maker is information of a wafer chuck of the manufacturing apparatus. Namely, it is information as for a configuration of a chuck for holding a wafer in a manufacturing apparatus which is used in an aligner, a dry etching system or the like used for manufacture of a device.

For example, tolerance of a stepper used for an aligner in a lithography process to a wafer configuration is very small, and it tends to cause a problem of a chuck configuration of a stepper on the side of a device maker. Therefore, as information as for a wafer chuck, information such as flatness of the chuck at the time of use and a configuration of the peripheral part is effective.

It is important in a dry etching process that a state (configuration) of a back surface of a wafer matches a chuck configuration. Accordingly, information as for the wafer chuck used in such a process includes a state of a surface of the chuck, for example, a wafer sucking area and a sucking method, and roughness of the surface of the chuck or the like as still more detailed information.

In this case, it is preferable that the above-mentioned information of the device manufacturing process includes information expressed with an ABC parameter which consists of a maximum value A, a minimum value B and a standard deviation C of displacement between a reference line in a wafer surface and the wafer surface.

The ABC parameter is quality information which is not in a general specification as described above. The evaluation with the ABC parameter is desirable since it can define a wafer configuration more accurately than the conventional index indicating flatness such as SFQR. In particular, according to the A and B parameter, quality which becomes a problem in a wafer chuck of a stepper or the like can be correctly grasped by evaluating quantitatively a configuration of a periphery part of a wafer such as rise or sag. The ABC parameter can be used for evaluation of not only a wafer configuration but a chuck configuration or the like. Accordingly, if an order for a wafer with a defined ABC parameter is received, the value should be received. Alternatively, a chuck configuration of an aligner analyzed by the ABC parameter can be received as information of the device manufacturing process.

Especially, for example, in the case that the information in the past such as the optimal wafer in a new device manufacturing line in a device maker is not enough, the information with this characteristic is desirable. If it is the ABC parameter, it is very helpful information for manufacture of a wafer.

In this case, it is preferable that the above-mentioned information of the device manufacturing process includes information as for at least one process selected from a lithography process, a heat treatment process, a CMP process, and an etching process.

In the present circumstance, a wafer configuration especially becomes a problem, and the above-mentioned process information which influences a wafer configuration is useful. However, it is not necessary for the present invention to be limited thereto. For example, information of a device manufacturing process on the side of the device maker may be information as for a lithography process, a heat treatment process, a CMP process, and an etching process. For example, the process information on a heat treatment process may be either information as for a heat treating furnace or other information.

For example, since a gettering capacity or the like is varied with heat treatment conditions on the side of a device maker and types of single crystal ingots manufactured on the side of the wafer maker, it is necessary to control finely characteristics of the single crystal ingots or the like according to the heat treatment conditions. In this case, a wafer maker receives and analyzes a type of a heat treating furnace, a model number, heat treatment conditions or the like as information as for a heat treatment process, controls especially desired oxygen concentration, nitrogen concentration or the like in the wafer to be manufactured, selects a wafer manufacturing process corresponding to a device manufacturing process, and manufactures a desired wafer.

In this case, it is preferable to further include a step of returning information of a semiconductor wafer as for a semiconductor wafer to be manufactured by the selected wafer manufacturing process to the device maker.

As described above, by returning information of a semiconductor wafer to the device maker, when the device maker orders a wafer later, the parameter can be sent as information of the device manufacturing process, and furthermore, the relation between the ABC parameter, a configuration of the back surface of the wafer or the like and a yield can be confirmed, and the wafer can be narrowed down to the optimal wafer again. Thereby, the desirable order for the wafer suitable for the device manufacturing process can be performed.

In this case, the above-mentioned information of the semiconductor wafer to be returned preferably includes the above-mentioned ABC parameter of the semiconductor wafer to be manufactured and/or a configuration of a back surface of the semiconductor wafer.

The evaluation with the ABC parameter can define a wafer configuration more accurately than the conventional index such as SFQR. Moreover, the configuration of the back surface of the semiconductor wafer becomes a problem when chucking the wafer by the stepper or the like. Therefore, the desirable order for the wafer suitable for the device manufacturing process comes to be able to be performed on a device maker's side by returning a recommended ABC parameter and a recommended configuration of the back surface.

In this case, it is preferable that analysis of the above-mentioned information of the device manufacturing process and selection of a wafer manufacturing process are performed using the above-mentioned ABC parameter of the semiconductor wafer to be manufactured and/or the configuration of the back surface of the semiconductor wafer.

As described above, it is desirable that analysis of the information by, for example, a customer computer is performed based on the ABC parameter and/or the configuration of the back surface. Selection of the wafer manufacturing process which can manufacture the semiconductor wafer having the demanded wafer characteristics becomes easy by linking the relation between the ABC parameter or the configuration of the back surface and the wafer production line or the like and analyzing them.

The present invention also provides a system for receiving an order for manufacture of a semiconductor wafer comprising at least a client terminal in a device maker and a customer computer in a wafer maker, wherein at least information of a device manufacturing process as for a device manufacturing process in the device maker is inputted into the above-mentioned client terminal by the device maker, and the above-mentioned information of the device manufacturing process is sent through a network, the above-mentioned customer computer receives the sent information of the device manufacturing process, the information of the device manufacturing process is analyzed, and the wafer manufacturing process which can manufacture the semiconductor wafer having wafer characteristics corresponding to the above-mentioned information of the device manufacturing process is selected.

Collection of detailed information and quick selection of a production line are important in order to supply a wafer suitable for the device maker. If the above-mentioned system for receiving an order using the computer through the networks is utilized, information on a device maker can be obtained smoothly, and improvement in service can be achieved. Moreover, the determination of a production line of the wafer maker also becomes easy, and the recommended wafer further suited to the process in the device maker or the like can be provided.

In this case, it is preferable that the above-mentioned information of the device manufacturing process includes information as for an apparatus used in the device manufacturing process of the above-mentioned device maker.

Because there is a tendency that a yield becomes different from each apparatus at the present circumstance, it needs to supply a wafer suited to each apparatus. It is especially effective in the case that the wafer which has already been used in a current line on the side of the device maker is ordered. Only the model number or the like of the apparatus to be used is inputted in a client terminal, and thus it is easy to be inputted.

In this case, it is preferable that the above-mentioned information as for the apparatus to be used in the device maker includes information as for a wafer chuck of the above-mentioned apparatus.

For example, tolerance of a stepper used for an aligner in a lithography process to a wafer configuration is very small, and it tends to cause a problem of a chuck configuration of a stepper on the side of a device maker. In this case, as information as for a wafer chuck, information such as flatness of the chuck and a configuration of the peripheral part at the time of use is effective. Moreover, it is important in a dry etching process that a state (configuration) of a back surface of a wafer matches a chuck configuration. Accordingly, as information as for the wafer chuck used in such a process, information such as a state of the surface of the chuck, for example, a wafer sucking area and an sucking method, and roughness of the surface of the chuck or the like as still more detailed information are effective.

In this case, it is desirable that the above-mentioned information of the device manufacturing process includes information expressed with the ABC parameter which consists of a maximum value A, a minimum value B and a standard deviation C of displacement between a reference line in a wafer surface and the wafer surface.

The ABC parameter is described above. The evaluation with the ABC parameter is desirable since it can define a wafer configuration more accurately than the conventional index indicating flatness such as SFQR.

In this case, it is preferable that the above-mentioned information of the device manufacturing process includes information as for at least one process selected from a lithography process, a heat treatment process, a CMP process and an etching process.

For example, since a gettering capacity or the like is varied with heat treatment conditions on the side of a device maker and types of single crystal ingots manufactured on the side of the wafer maker, it is necessary to control finely characteristics of the single crystal ingots or the like according to the heat treatment conditions on the side of the device maker.

In this case, it is preferable that the above-mentioned customer computer returns information of a semiconductor wafer as for a semiconductor wafer manufactured by the selected wafer manufacturing process to a client terminal.

As described above, if the customer returns information of a semiconductor wafer to the device maker, when the device maker orders a wafer later, the parameter can be inputted into the client terminal as the information of the device manufacturing process, and furthermore, the relation between the ABC parameter, a configuration of the back surface of the wafer or the like and a yield can be checked, and the wafer can be narrowed down to the optimal wafer again. Thereby, the desirable order for the wafer suitable for the device manufacturing process can be performed.

In this case, the above-mentioned information of the semiconductor wafer to be returned preferably includes the above-mentioned ABC parameter of the semiconductor wafer to be manufactured and/or a configuration of a back surface of the semiconductor wafer.

The evaluation with the ABC parameter can define a wafer configuration more accurately than the index by the conventional SFQR or the like. Moreover, the configuration of the back surface of the semiconductor wafer becomes a problem when chucking the wafer by the stepper or the like. Therefore, the desirable order for the wafer suitable for the device manufacturing process comes to be able to be performed on a device maker's side by returning a recommended ABC parameter and a recommended configuration of the back surface.

In this case, it is preferable that analysis of the above-mentioned information of the device manufacturing process and selection of a wafer manufacturing process are performed using the above-mentioned ABC parameter of the semiconductor wafer to be manufactured and/or the configuration of the back surface of the semiconductor wafer.

As described above, it is desirable that analysis of the information by, for example, a customer computer is performed based on the ABC parameter and/or the configuration of the back surface. Selection of the wafer manufacturing process which can manufacture the semiconductor wafer having the demanded wafer characteristics becomes easy by linking the relation between the ABC parameter or the configuration of the back surface and the wafer production line or the like and analyzing them.

If a wafer is manufactured by the manufacture method in the present invention, a wafer with a configuration suited to each process in a device maker can be supplied, and a yield at the device maker will be improved.

Moreover, if the method for receiving an order in the present invention is performed and the system for receiving an order is used, a detailed response can be performed for each device production line in the device maker. Furthermore, on a wafer maker's side, determination of a wafer production line or the like also becomes easy.

BEST MODE FOR CARRYING OUT THE INVENTION

Hereafter, an embodiment of a method for manufacturing a semiconductor wafer, a method for receiving an order for manufacture of a semiconductor wafer and a system for receiving an order for manufacture of a semiconductor wafer according to the present invention will be explained with reference to drawings. The following embodiment is mere examples, and various changes are possible. In the following explanation, an example wherein a wafer having configuration suitable for an apparatus (an aligner) used in a device manufacturing process is supplied will be explained.

Figure 1:
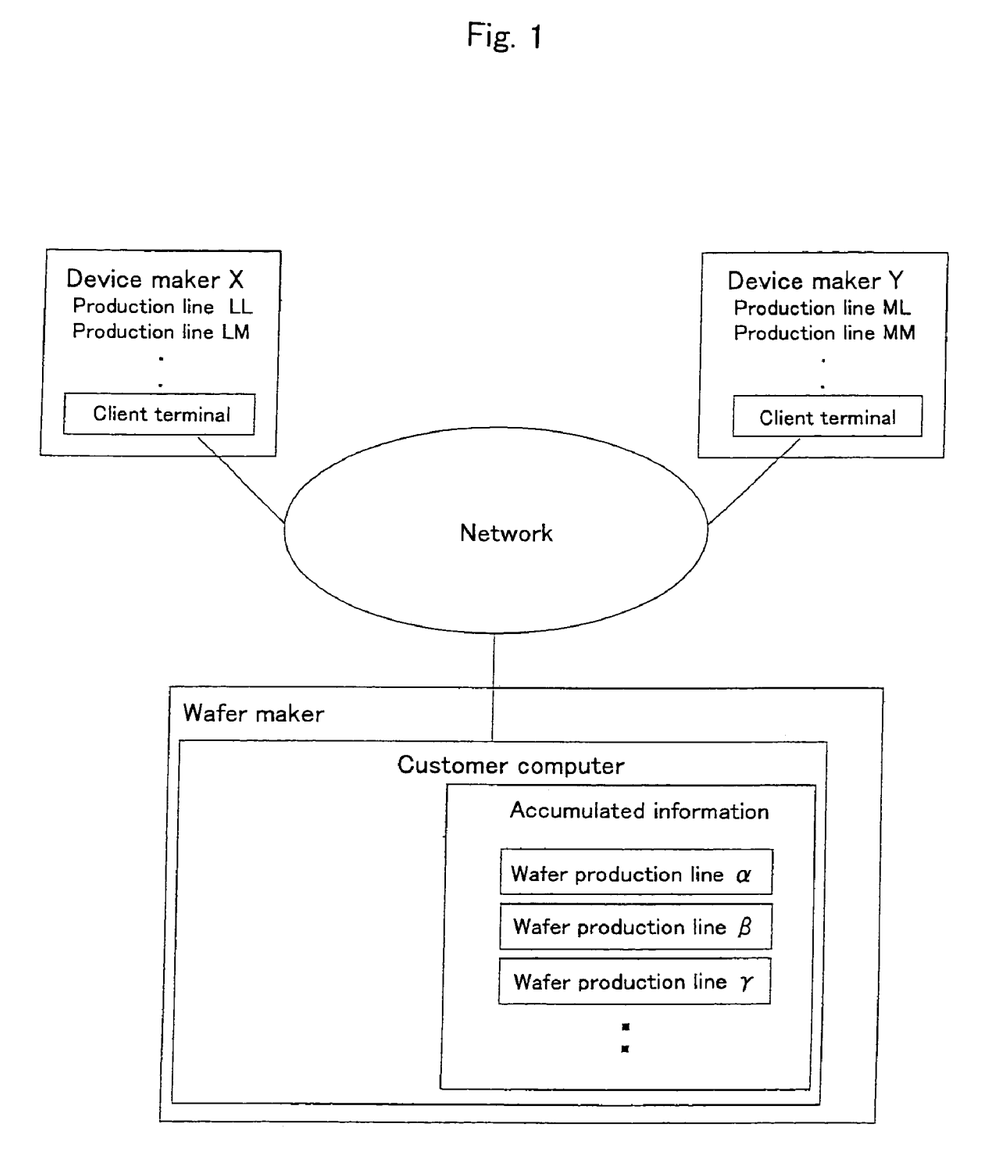
FIG. 1 is an explanatory diagram which shows an outline of a system for receiving an order for manufacture of a semiconductor wafer in a method for receiving an order for manufacture of a semiconductor wafer according to the present invention.

A system for receiving an order according to the present invention is constituted by connecting a wafer maker to a device maker which produces a device using the semiconductor wafer through a network such as Internet as shown in FIG. 1. A person in charge on the side of the device maker connects a client terminal with a customer computer on the side of the wafer maker, and inputs a desired specification for a general product and process information on the side of the device maker.

At the wafer maker's side, an automatically analyzing means in which information inputted into the customer computer is analyzed and a production line containing the optimal manufacturing process is simulated is built, and a production line is determined by this customer computer. Thereby, a wafer which has wafer characteristics suitable for the device manufacturing process on the side of the device maker is manufactured and supplied.

Figure 2:
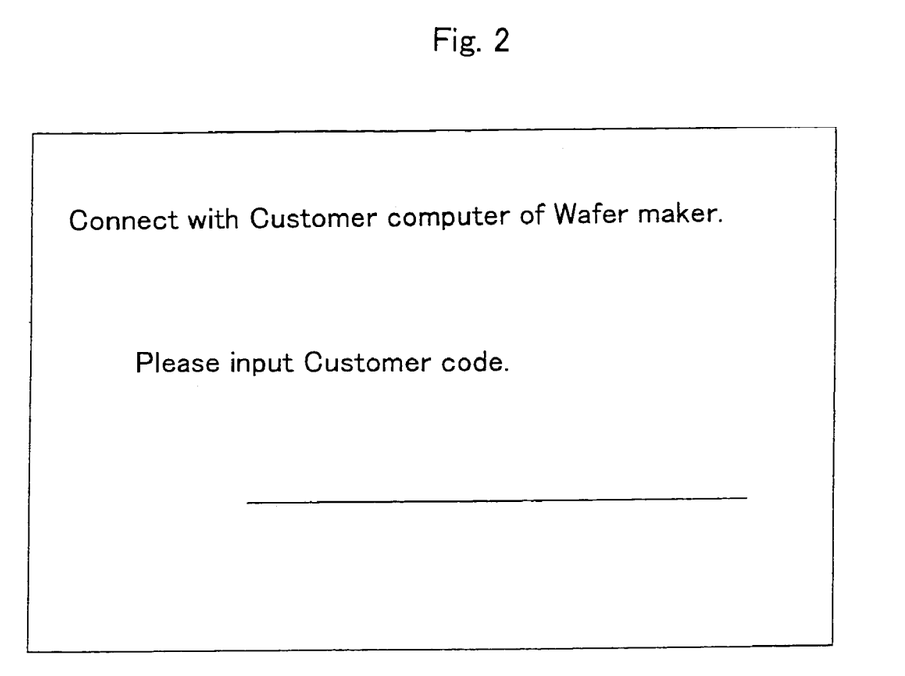
FIG. 2 is a drawing showing an example of an input screen for customer information on a client terminal in a method for receiving an order for manufacture of a semiconductor wafer according to the present invention.

The embodiment will be explained in more detail below. A person in charge on the side of a device maker connects a client terminal with a customer computer on the side of a wafer maker, and inputs a desired specification for a general product and information of a device manufacturing process on the side of the device maker. Specifically, as shown in FIG. 1, after connecting with the customer computer on the side of a device maker through Internet or the like, customer information (name of the device maker, name of a factory, or the like) is inputted on a screen as shown in FIG. 2. It is desirable to predetermine a code or the like therefor.

Figure 3:
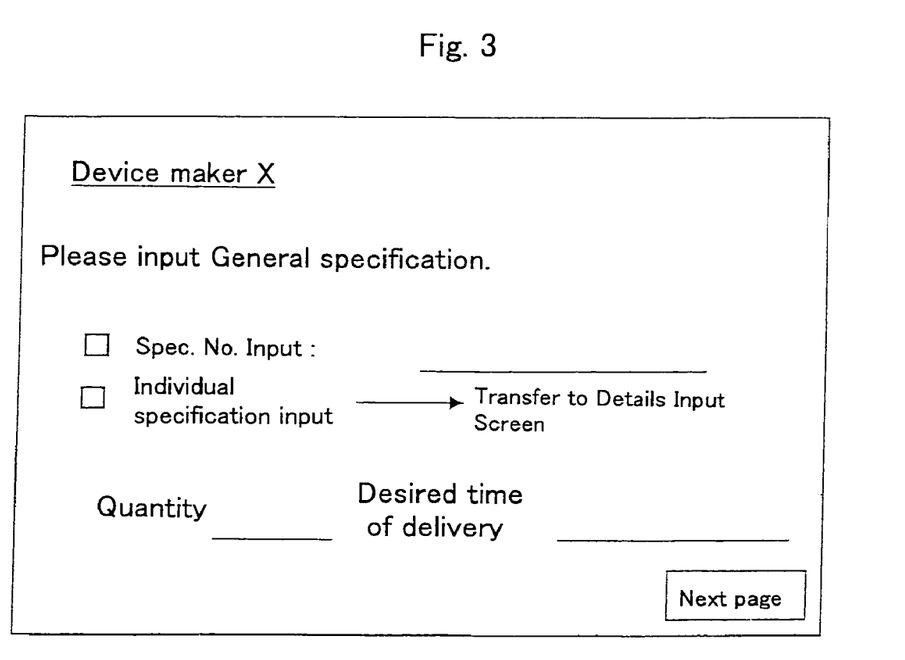
FIG. 3 is a drawing showing an example of an input screen for a general specification on a client terminal in a method for receiving an order for manufacture of a semiconductor wafer according to the present invention.

After a customer code is inputted, a desired specification for a general product is confirmed as shown in FIG. 3. In the case that detailed specifications such as a specification number which has already been decided or the like have been determined, such a number is inputted. If a type of a wafer, conductivity type, a diameter, specific resistance, oxygen concentration, impurity characteristics, crystal quality such as crystallinity, and a wafer quality such as thickness, flatness, glossiness or the like are to be newly set up, they can be inputted in detail on an individual specification input screen (un-illustrated) (the quality item is arbitrary).

Figure 4:
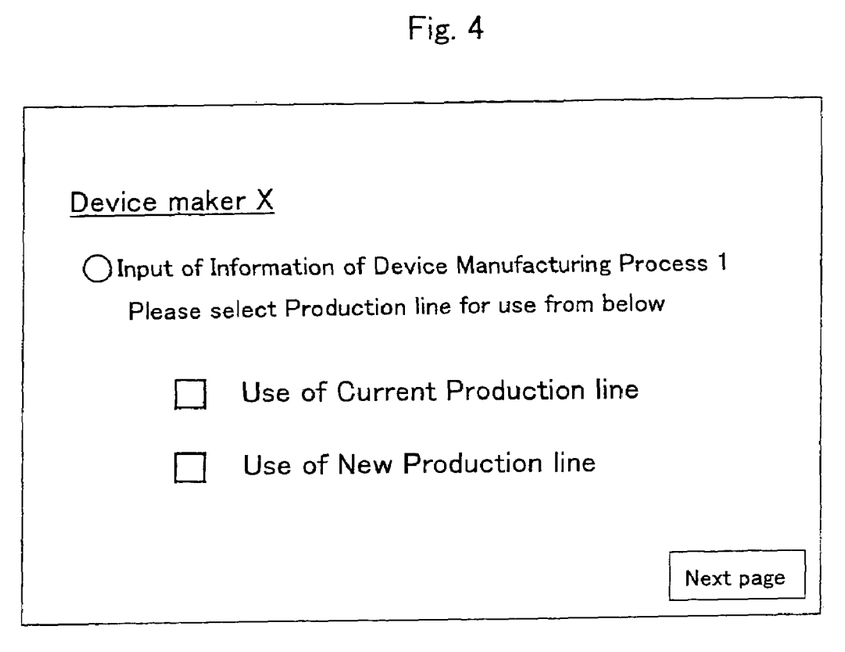
FIG. 4 is a drawing showing an example of an input screen for information of a device manufacturing process on a client terminal in a method for receiving an order for manufacture of a semiconductor wafer according to the present invention.

Next, information of the device manufacturing process is inputted. It is necessary to check information of the device manufacturing process which can be inputted from the device maker beforehand. For example, as shown in FIG. 4, it is confirmed whether a production line used in the device maker is a current manufacturing process (which has already been used) or a new production line (however, such information is not always necessary to be inputted).

Figure 5:
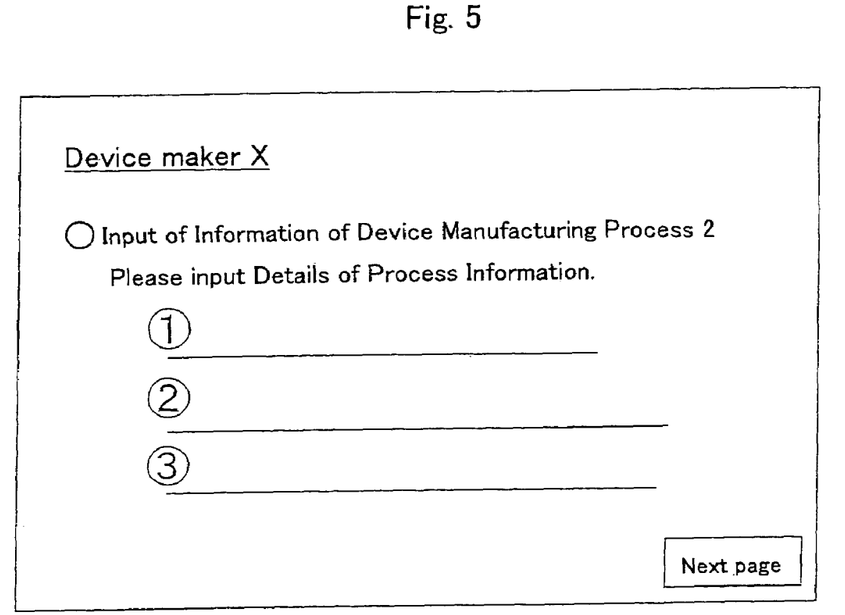
FIG. 5 is a drawing showing an example of an input screen for information of a device manufacturing process on a client terminal in a method for receiving an order for manufacture of a semiconductor wafer according to the present invention.

Then, as shown in FIG. 5, details of information of the device manufacturing process is inputted. It is also necessary to check what information is provided from a device maker, and thereby it is decided what information of the device manufacturing process should be inputted, and how the optimal wafer is determined (analyzed). The information of the device manufacturing process is preferably information as for an apparatus, more detailed information as for a configuration of a wafer chuck of an aligner or the like.

Especially, in the currently used production line, information of the device manufacturing process on the side of the device maker is desirably information as for an apparatus used in the device maker. In this case, a model number of the apparatus usually used or the like is inputted. Although a device maker has two or more apparatuses and processes, the information as for the apparatus with a bad yield or the like among them should be provided.

Moreover, it is more preferable that information of the device manufacturing process on the side of the device maker is the information as for the configuration of the wafer chuck of the aligner. This is because a yield in an aligner is especially a problem in the device maker, and it is important to supply a wafer suitable for this process.

Especially, the process information on the side of the device maker is preferably information with an ABC parameter. It is particularly utilized in the case that the wafer used in a new line is ordered and received as well as in the case of a current line. The chuck configuration of the aligner is evaluated with the ABC parameter, and information thereof is provided to the wafer maker. In the wafer maker which obtains the ABC parameter, it is preferable because it becomes easier to select a wafer manufacturing process to determine a production line.

Next, a manner of analyzing the information inputted into the customer computer and carrying out a simulation of the optimal wafer production line will be explained. Customer information, production line information and the like are accumulated in the customer computer on the side of the device maker. The accumulated information can be in a various form, and is not limited. For example, claim information, yield information and the like from a device maker in the past are accumulated. In addition, the wafer production line information of the wafer maker is inputted, and these are linked together.

Moreover, it is preferable that data of the optimal wafer configuration for each production line on the side of a device maker are accumulated as quality of an ABC parameter.

In the wafer maker, two or more pieces of information such as a wafer production line and characteristics of wafer configuration are stocked. Especially, as for the wafer configuration, the ABC parameter with which a wafer is easy to be manufactured is obtained and recorded for each production line.

The ABC parameter is excellent quality in the point that compatibility with an aligner or the like can be checked, since a configuration of a wafer at a periphery part can be grasped accurately.

The analysis procedure of the embodiment comprises simulating and selecting the wafer production line which consists of the optimal wafer manufacturing processes based on the information of the device manufacturing process inputted by the device maker.

Figure 7:
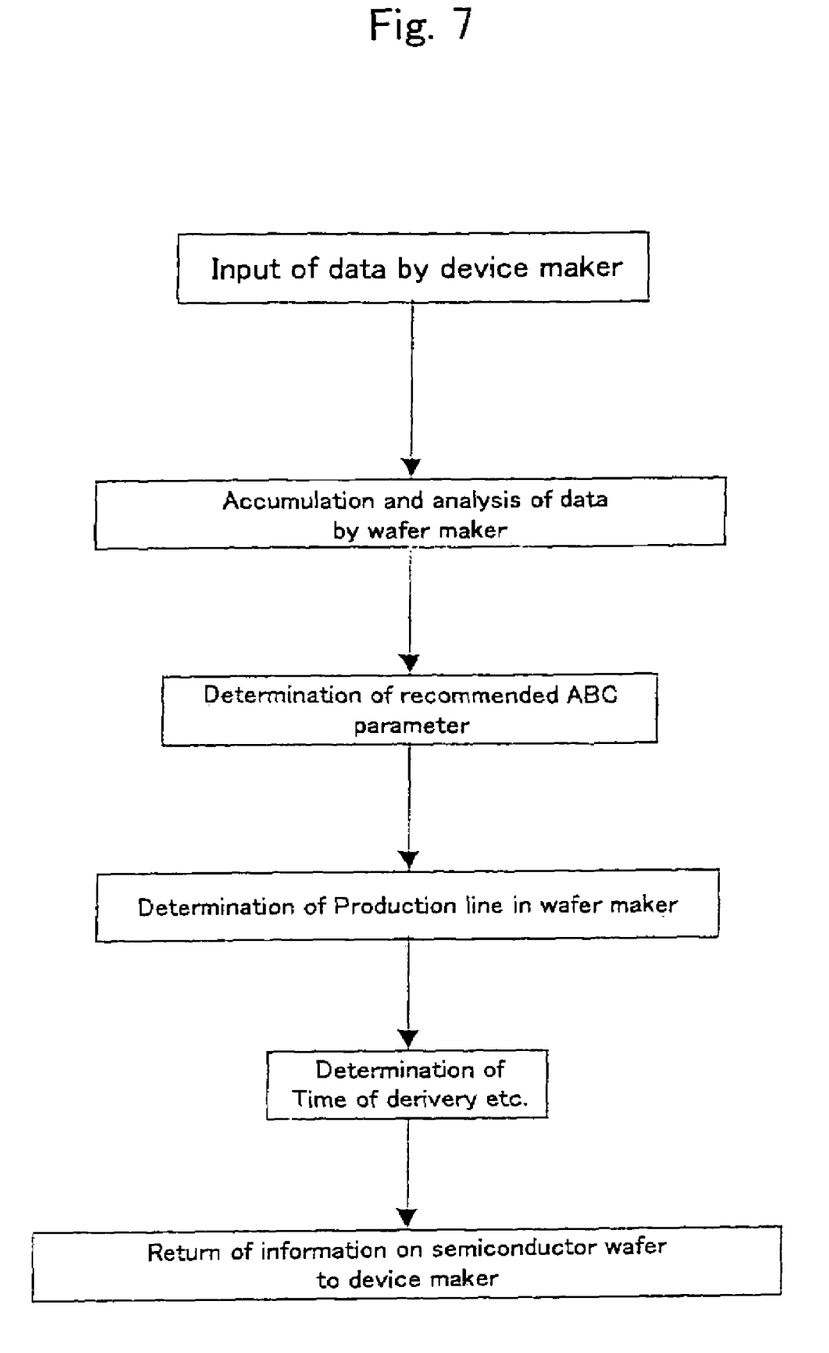
FIG. 7 is a flow chart showing an example of a method for receiving an order for manufacture of a semiconductor wafer according to the present invention.

In a general flow, as shown in FIG. 7, when the data as for a device manufacturing process is inputted by the device maker, data is accumulated in the customer computer on the side of the wafer maker, and the optimal wafer manufacturing process is analyzed using the past data or the like. An ABC parameter is used as a parameter for this analysis, and a recommended ABC parameter suitable for a device manufacturing process on the side of a device maker is determined. Next, the wafer production line consisting of the wafer manufacturing process in which the wafer with this ABC parameter can be manufactured is determined. Time of delivery or the like is determined with taking the operation situation of the production line or the like into consideration, and the result is returned to the device maker.

The above processes from the data accumulation and analysis by the wafer maker to the determination of the production line on the side of a device maker and the determination of time of delivery is preferably programmed so as to be automatically simulated on a customer computer.

A method of the simulation is not limited. Various analysis programs have been built using the information of the device manufacturing process on the side of a device maker.

For example, it may be checked whether there was a claim in the production line in the past using the process information inputted by the device maker. Thereby, if there was no claim, a list of production lines in which devices were manufactured by the wafer maker in the past are picked up, and then the wafer configurations which are easy to be manufactured with the picked-up production lines are listed with an ABC parameter. The ABC parameters are analyzed, and the analysis program to determine the wafer configuration suitable for the device manufacturing process and the device production line on the side of a device maker which ordered can be used.

Moreover, when there was a claim in the past, it is programmed so that a decision of avoiding the production line may be made. Furthermore, it is controlled so that the wafer with the wafer configuration which is easy to be produced in a process with the claim may be neither manufactured nor consigned.

Moreover, data may be accumulated for each process or apparatus on the side of a device maker and they may be collated such that a wafer with a certain ABC parameter should be made for the apparatus with the model number of 111 in the device maker X, a wafer with a certain ABC parameter should be made for the process MM in the device maker Y.

In addition, a device maker may be asked to input a configuration of a chuck of an aligner inputted with the ABC parameter or the like in the case of a new production line. This ABC parameter and the ABC parameter of the wafer which should be manufactured are analyzed, and then a desirable wafer and a manufacturing process in which it can be manufactured is chosen, and a production line is determined. A model number of an apparatus or the like may be inputted, and it may be collated and analyzed with the information in the past used in the same apparatus to presume the optimal wafer. As described above, if analysis is performed mainly using an ABC parameter, it will be easy to solve the problem of a wafer configuration.

Besides, a wafer with a known ABC parameter (standard wafer) is supplied to a device maker from a wafer maker. This standard wafer is used in the device maker, and the wafer is set in the corresponding apparatus such as a stepper. The configuration data in the state that it is set in the stepper or the like is obtained, and is inputted as information of the device manufacturing process. Taking the difference from the ABC parameter of the standard sample or the like into consideration based on the data, the wafer suitable for the stepper is simulated on the side of the device maker. Thereby, the ABC parameter of the wafer suitable for the stepper can be determined.

As described above, the desirable ABC parameter of a wafer is analyzed in the device manufacturing process. Next, this result and the ABC parameter information on the wafer production line on the side of the device maker are linked, and the optimal wafer production line is determined.

The wafer configurations (ABC parameter, roughness of back surface, or glossiness) which are easy to be formed are accumulated for each production line by the wafer maker, and the production line which can manufacture a wafer with the desirable ABC parameter previously simulated by the device side is determined.

As described above, the customer computer is constructed so that information of the wafer production line and the device manufacturing information by the device maker may be linked, and the optimal wafer production line may be simulated. Therefore, receipt of an order, and manufacture and supply of the optimal wafer can be quickly carried out by simulating with it. Conventionally, it is common that information on the side of the device maker is obtained from a person in charge of sales on the side of a device maker. However, if the method for ordering according to the present invention is used, an exact response can be performed even in the case that the person in charge of sales or the like is changed, since the information on the device maker is inputted into the customer computer.

Furthermore, since information of the device manufacturing process can be inputted into a customer computer by the device maker itself, an exact and prompt response can be performed.

A wafer is manufactured in the production line which consists of the chosen and determined wafer manufacturing process as described above. The production line on the side of the device maker comprises two or more processes. The general method for manufacturing a silicon wafer comprises: a process of growing a single crystal in which a single crystal ingot is produced using Czochralski (CZ) method or the like, and a wafer manufacturing process in which this single crystal ingot is sliced and at least one main surface thereof is processed to be a mirror surface. Explaining a wafer manufacturing process in more detail, it comprises a slicing process in which a single crystal ingot is sliced and a thin disk-like wafer is obtained, a chamfering process in which its periphery part is chamfered in order to prevent breakage and crack of the wafer obtained according to the slicing process, a lapping process in which the wafer is flattened, an etching process in which mechanical damage remaining on the chamfered and wrapped wafer is removed, a polishing process in which a surface of the wafer is made a mirror surface, and a cleaning process in which a polishing agent or impurity adhered on the wafer is remove by cleaning the polished wafer. Main processes are shown in the above-mentioned wafer manufacturing process, and there may be the cases that other processes such as a heat treatment process is added, the same process is performed in multiple steps, or the order for processes is changed.

Various apparatuses are used in each process, and there is a lot of manufacturing conditions or the like. Therefore, innumerable types of production lines of a wafer exist. Consequently, there exists a lot of wafer manufacturing processes which fulfill the general specification demanded at the present. Since characteristics which may cause a problem at the device maker's side and the wafer manufacturing process which should be improved at the wafer maker's side are grasped experientially, a wafer becomes suitable for the device maker's side, or becomes an unsuitable wafer by changing conditions slightly in this latest production line. For example, since a process of pulling a crystal ingot, a mirror-polishing process in terms of a wafer configuration, and the like are especially important as the process which affects wafer quality, the conditions in these processes are mainly adjusted.

Moreover, it has been found that a wafer configuration, especially a configuration of a periphery part of a wafer is important in the process using an aligner in the device production line. Although high flatness of a wafer configuration is generally more desirable, in a production line on the side of a device maker, especially in the process using the an aligner or the like, there are cases that a yield is better when the periphery configuration of a wafer is sagging, that a yield is better when it is rising up conversely, and that a degree of sag has to be controlled in a certain range.

Then, as an easy example of manufacturing the wafer which has the wafer characteristics suitable for each device manufacturing process on the side of a device maker, at the wafer maker's side, manufacturing lines which are roughly classified into three lines are prepared depending on the device manufacturing process by a device maker (information of the device manufacturing process), which are a line in which a periphery part of a wafer made to rise, a line in which it is made to sag, and a line in which it is controlled in a certain range when manufacturing a wafer.

Figure 6:
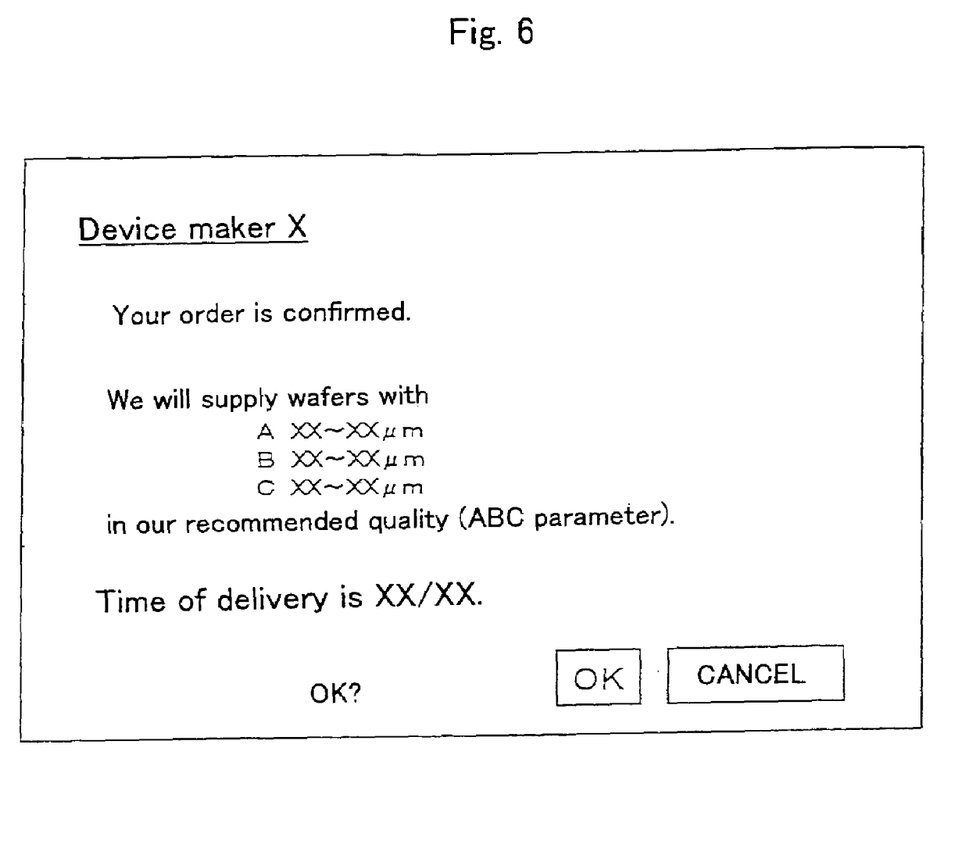
FIG. 6 is a drawing showing an example of a screen on a client terminal when information of a semiconductor wafer is returned to a device maker in a method for receiving an order for manufacture of a semiconductor wafer according to the present invention.

If a wafer production line is determined as shown in FIG. 6, taking processing capacity of the wafer production line, an order for manufacturing a wafer at the present or the like into consideration, simulation of the time of delivery or the like is carried out, and are turn to a device maker is performed. Moreover, as a wafer configuration to be supplied, an ABC parameter or the configuration of the back surface of a wafer can be appended as a reference value. If such semiconductor wafer information is returned to a device maker, the compatibility between the ABC parameter or the configuration of the back surface and the device production line can be grasped even in the device maker, and it is helpful at the time of a future order.

If the compatibility between the wafer supplied as described above and the production line on the side of the device maker is good, an order with the ABC parameter or the configuration of the back surface can be conducted from the next time, and thus a ordering process will also become easy from the next time.

In this way, a wafer maker also changes the way of thinking as for a batch process. That is, production of various types with a small amount can be performed.

If manufacture is finished at a wafer maker's side, it is preferable to supply a wafer with printing a laser mark corresponding to process information on a wafer when a wafer is supplied to a device maker. If it is conducted as described above, a device maker can also grasp easily into which process the purchased wafer should be put.

Although Examples of the present invention are given and explained concretely hereafter, the present invention is not limited thereto.

EXAMPLE 1

(Input of Device Manufacturing Process Information Data by a Device Maker)

A customer computer was connected to a client terminal of device maker X through a network, and there was an order. For the device maker X, it was an order for the wafer by the conventional production line LL. As information on the device manufacturing process, the model number 111 of the apparatus used in a stepper process was inputted.

(Accumulation and Analysis of Device Manufacturing Process Information Data by a Wafer Maker)

When past information was collated using a customer computer, there was a claim of lowering of a yield as for the apparatus of the model number 111 used in a stepper process. The wafer supplied at that time was produced by a production line $\alpha$ in the device maker. This production line was avoided and processes suitable for a general specification were picked up. There existed production lines $\beta$ and $\gamma$ which had supplied wafers in the past therein. As for these production lines, yields are good.

(Determination of a Recommended ABC Parameter)

Moreover, since wafer configurations (ABC parameters) which could be manufactured with the above-mentioned wafer production lines were accumulated in the customer computer, these wafer manufacturing processes and wafer configurations were collated. As a result, it was found that a periphery part of the wafer was a rising configuration as for the wafer production line $\alpha$ (A parameter is 150 μm or more). The production lines $\beta$ and $\gamma$ were the lines where sagging configurations tend to be formed (A parameter is 100 μm or less). Therefore, A parameter of a wafer desirable to the model number 111 of the apparatus used in the stepper process of the conventional production line LL in the device maker X was 100 μm or less. B parameter was from −400 to 800 μm, and C parameter was 20 μm or less.

(Determination of a Wafer Production Line and Time of Delivery by the Wafer Maker)

Next, a wafer production line was chosen and determined based on the above-mentioned ABC parameter. The lines which could manufacture the wafer suitable for the above-mentioned conditions were two or more processes, such as production lines $\beta$, $\gamma$, $\xi$ and $\eta$. In consideration of the processing capacity and cost of manufacturing, the wafer production line $\gamma$ was chosen by the wafer maker, and time of delivery was computed.

(Returning of Semiconductor Wafer Information to the Device Maker)

The above-mentioned semiconductor wafer information was returned to the device maker. The information as for the above-mentioned ABC parameter was appended to the reply.

Order for a wafer from the device maker was formally performed based on the above-mentioned result. The wafer maker manufactured a wafer by the wafer production line $\gamma$, numbering showing that it should be put in the production line LL in the device maker X was performed by printing a laser mark, and the wafer was supplied to the device maker.

EXAMPLE 2

(Input of Device Manufacturing Process Information Data by a Device Maker)

A customer computer was connected to a client terminal of device maker Y through a network, and there was an order. For the device maker Y, it was an order for the wafer by the conventional production line MM. As information on the device manufacturing process, the ABC parameter which was the information provided in the past was inputted.

(Accumulation and Analysis of Device Manufacturing Process Information Data by a Wafer Maker)

When past information was collated using a customer computer, it was confirmed that there was no claim as for the wafer with the above-mentioned ABC parameter. The production line which supplied the wafer in the past was taken up. They were production lines $\alpha$, $\delta$, and $\epsilon$.

(Determination of a Recommended ABC Parameter)

Since there were no claim in the past, the ABC parameter previously inputted from the device maker was used as a recommended ABC parameter as it was.

(Determination of a Wafer Production Line Maker and Time of Delivery by the Wafer)

Next, a wafer production line was chosen and determined based on the above-mentioned ABC parameter. The lines which could manufacture the wafer suitable for the above-mentioned conditions were two or more processes, such as production lines $\alpha$, $\delta$, $\epsilon$ and $\theta$. In consideration of the processing capacity and cost of manufacturing, the wafer production line $\delta$ was chosen by the wafer maker, and time of delivery was computed.

(Returning of Semiconductor Wafer Information to the Device Maker)

The above-mentioned semiconductor wafer information was returned to the device maker. The information as for the above-mentioned ABC parameter was appended to the reply. The device maker confirmed it, and ordered.

EXAMPLE 3

(Input of Device Manufacturing Process Information Data by a Device Maker)

A customer computer was connected to a client terminal of device maker Z through a network, and there was an order. For the device maker Z, it was an order for the wafer by new production line NN. As information on the device manufacturing process, model number of an apparatus and its chuck configuration used at a stepper process were inputted.

(Accumulation and Analysis of Device Manufacturing Process Information Data by a Wafer Maker)

When past information was collated by a customer computer, there was a claim of lowering of a yield from the device maker. The wafer supplied at that time was produced by a production line $\alpha$ in the device maker. This production line was avoided and the processes suitable for a general specification were picked up. There existed no production line which had supplied a wafer in the past (since it was a new production line). Then, past information was collated as for the model number used at the stepper process. The apparatus was not used by the device maker Z, but was used by other device makers. It had been known that preferable configurations of the apparatuses were sagging configurations.

(Determination of a Recommended ABC Parameter)

Moreover, using the information on a wafer chuck configuration, as ABC parameter, A parameter was determined to be 150 nm or less, B parameter was determined to be 800 nm or less, and C parameter was determined to be 25 µm or less.

(Determination of a Wafer Production Line and Time of Delivery by the Wafer Maker)

Next, a wafer production line was chosen and determined based on the above-mentioned ABC parameter. The lines which could manufacture the wafer suitable for the above-mentioned conditions were two or more processes, such as production lines β, γ, ξ, η and ι. In consideration of the processing capacity and cost of manufacturing, the wafer production line β was chosen by the wafer maker, and time of delivery was computed.

(Returning of Semiconductor Wafer Information to the Device Maker)

The above-mentioned semiconductor wafer information was returned to the device maker. The information as for the above-mentioned ABC parameter was appended to the reply. The device maker confirmed it, and ordered.

The present invention is not limited to the above-described embodiment. The above-described embodiment is a mere example, and those having the substantially same structure as that described in the appended claims and providing the similar action and effects are included in the scope of the present invention.

For example, in the above-described embodiment, the order is from a lithography process, especially a device production line wherein there is a problem in a yield of an aligner such as a stepper, and the optimal wafer is analyzed mainly with the ABC parameter. However, in the case that there is a problem especially in a yield of a dry etching process at a device maker's side, the algorithm of the analysis for a dry etching process may be used. That is, the algorithm for analysis suitable for the device manufacturing process on the side of a device maker is programmed.

For example, thermal conductivity is a problem at a dry etching process, it needs to be cautious of a configuration of the back surface of a wafer, and the optimal wafer is mainly analyzed with the parameter of the configuration of the back surface. That is, the optimal wafer configuration of the back surface is analyzed with the chuck configuration obtained from the device maker, especially with a state of a chuck surface for holding a wafer, for example a sucking area and a sucking method of a wafer, roughness of the chuck surface or the like as still more detailed information. Then, a recommended configuration of the back surface is determined, the production line of a wafer is determined based on the result, time of delivery or the like is further determined, and the results are replied. In a dry etching process or the like, a contact area of a chuck surface and a back surface of a wafer becomes a problem. Taking the above-mentioned configuration of the chuck surface or the like into consideration, a warp or a waviness on the back surface of a wafer, the roughness with a still finer period or the like can be defined so that preferable contact area may be achieved. That is, a wafer configuration of the back surface mainly means a warp or a waviness of a back surface of a wafer, and roughness with a still finer period. However, since it is difficult to express these configurations with one value, these configurations of the back surface may be defined with a brightness measured by a gloss meter as a substitutive quality reflecting these configurations. Although brightness (glossiness) is also contained in a general specification, it has an extensive range numerically. Actually, it is important to define it in a narrower range, and the configuration of the back surface (glossiness) suitable for the process on the side of a device maker is returned.

Furthermore, a device process includes a lithography process, a heat treatment process, a CMP process, and an etching process in other modes, and a yield may be lowered in these processes in some cases. Therefore, the information as for these processes may be combined with information of the device manufacturing process using the algorithm of the above-mentioned analysis, and the ABC parameter and configuration of the back surface (glossiness) as for them are combined to narrow down a still more optimal wafer and define a wafer manufacturing process.

Moreover, in the above-mentioned embodiment, although the person in charge on the side of the device maker connects with the customer computer on the side of the device maker and inputs information from a client terminal, the same effect maybe achieved even if the person in charge of sales on the side of a device maker may get information of the device manufacturing process and input the information of the device manufacturing process.

Furthermore, the present invention is not limited to a display such as the FIGS. 2–6 or input items shown in the embodiment, and they can be arbitrarily set.

In addition, it goes without saying that suitable information-security means is established in the present invention. For example, identification means for identifying a customer, security-protection means such as encryption for maintenance of customer information, and access-control means, and the like are established suitably.

The invention claimed is:

1. A method for manufacturing a semiconductor wafer comprising:
   obtaining a specification of a device maker's wafer order, and information of a device manufacturing process from the device maker;
   analyzing the information of the device manufacturing process and selecting a corresponding wafer manufacturing process which can manufacture a semiconductor wafer having wafer characteristics determined by the specification and the analysis of the information of the device manufacturing process; and
   manufacturing a semiconductor wafer according to the selected wafer manufacturing process and said device manufacturing process information.

2. The method for manufacturing a semiconductor wafer according to claim 1, wherein the information of the device manufacturing process includes information as for an apparatus used in the device manufacturing process.

3. The method for manufacturing a semiconductor wafer according to claim 2, wherein the information as for the apparatus used in the device manufacturing process includes information as for a wafer chuck of the apparatus.

4. The method for manufacturing a semiconductor wafer according to claim 1, wherein the information of the device manufacturing process includes information expressed with an ABC parameter, said ABC parameter comprising a maximum value A, a minimum value B and a standard deviation C of displacement of a reference line in a wafer surface and the wafer surface.

5. The method for manufacturing a semiconductor wafer according to claim 3, wherein the information of the device manufacturing process includes information expressed with an ABC parameter, said ABC parameter comprising a maximum value A, a minimum value B and a standard deviation C of displacement of a reference line in a wafer surface and the wafer surface.

6. The method for manufacturing a semiconductor wafer according to claim 1, wherein the information of the device manufacturing process includes information as for at least one process selected from a lithography process, a heat treatment process, a CMP process, and an etching process.

7. The method for manufacturing a semiconductor wafer according to claim 5, wherein the information of the device manufacturing process includes information as for at least one process selected from a lithography process, a heat treatment process, a CMP process, and an etching process.

8. The method for manufacturing a semiconductor wafer according to claim 1 further comprising a step of placing a laser mark on the semiconductor wafer indicating at least some of the information of the device manufacturing process.

9. The method for manufacturing a semiconductor wafer according to claim 7 further comprising a step of placing a laser mark on the semiconductor wafer indicating at least some of the information of the device manufacturing process.

10. A method for receiving an order for manufacture of a semiconductor wafer comprising:
    connecting a device maker with a customer computer in a wafer maker through a network, wherein the customer computer in the wafer maker receives from the device maker through a network at least a specification of a device maker's wafer order, and information of a device manufacturing process; and
    analyzing the information of the device manufacturing process and selecting a wafer manufacturing process in which a semiconductor wafer having wafer characteristics determined by the specification and the analysis of the information of the device manufacturing process can be manufactured.

11. The method for receiving an order for manufacture of a semiconductor wafer according to claim 10, wherein the information of the device manufacturing process includes information as for an apparatus used in the device manufacturing process in the device maker.

12. The method for receiving an order for manufacture of a semiconductor wafer according to claim 11, wherein the information as for the apparatus used in the device maker includes information as for a wafer chuck of the apparatus.

13. The method for receiving an order for manufacture of a semiconductor wafer according to claim 10, wherein the information of the device manufacturing process includes information expressed with an ABC parameter, said ABC parameter comprising a maximum value A, a minimum value B and a standard deviation C of displacement between a reference line in a wafer surface and the wafer surface.

14. The method for receiving an order for manufacture of a semiconductor wafer according to claim 12, wherein the information of the device manufacturing process includes information expressed with an ABC parameter, said ABC parameter comprising a maximum value A, a minimum value B and a standard deviation C of displacement between a reference line in a wafer surface and the wafer surface.

15. The method for receiving an order for manufacture of a semiconductor wafer according to claim 10, wherein the information of the device manufacturing process includes information as for at least one process selected from a lithography process, a heat treatment process, a CMP process, and an etching process.

16. The method for receiving an order for manufacture of a semiconductor wafer according to claim 14, wherein the information of the device manufacturing process includes information as for at least one process selected from a lithography process, a heat treatment process, a CMP process, and an etching process.

17. The method for receiving an order for manufacture of a semiconductor wafer according to claim 10 further comprising a step of returning information of a semiconductor wafer to be manufactured in the selected wafer manufacturing process to the device maker.

18. The method for receiving an order for manufacture of a semiconductor wafer according to claim 16 further comprising a step of returning information of a semiconductor wafer to be manufactured in the selected wafer manufacturing process to the device maker.

19. The method for receiving an order for manufacture of a semiconductor wafer according to claim 17, wherein the information of the semiconductor wafer to be returned includes the ABC parameter of the semiconductor wafer to be manufactured and/or a configuration of a back surface of the semiconductor wafer, said ABC parameter comprising a maximum value A, a minimum value B and a standard deviation C of displacement of a reference line in a wafer surface and the wafer surface.

20. The method for receiving an order for manufacture of a semiconductor wafer according to claim 18, wherein the information of the semiconductor wafer to be returned includes the ABC parameter of the semiconductor wafer to be manufactured and/or a configuration of a back surface of the semiconductor wafer.

21. The method for receiving an order for manufacture of a semiconductor wafer according to claim 10, wherein analysis of the information of the device manufacturing process and selection of a wafer manufacturing process are performed using the ABC parameter of the semiconductor wafer to be manufactured and/or the configuration of the back surface of the semiconductor wafer, said ABC parameter comprising a maximum value A, a minimum value B and a standard deviation C of displacement of a reference line in a wafer surface and the wafer surface.

22. The method for receiving an order for manufacture of a semiconductor wafer according to claim 20, wherein analysis of the information of the device manufacturing process and selection of a wafer manufacturing process are performed using the ABC parameter of the semiconductor wafer to be manufactured and/or the configuration of the back surface of the semiconductor wafer.

23. A system for receiving an order for manufacture of a semiconductor wafer, comprising:
    a client terminal in a device maker: and
    a customer computer in a wafer maker,
    wherein at least a specification of a device maker's wafer order, and information of a device manufacturing process in the device maker are inputted into the client terminal by the device maker, and the specification and the information of the device manufacturing process are sent through a network, the customer computer receives the sent specification and information of the device manufacturing process, the information of the device manufacturing process is analyzed, and a wafer manufacturing process which can manufacture the semiconductor wafer having wafer characteristics determined by the specification and the analysis of the information of the device manufacturing process is selected.

24. The system for receiving an order for manufacture of a semiconductor wafer according to claim 23, wherein the information of the device manufacturing process includes information as for an apparatus used in the device manufacturing process.

25. The system for receiving an order for manufacture of a semiconductor wafer according to claim 24, wherein the information as for the apparatus used in the device manufacturing process includes information as for a wafer chuck of the apparatus.

26. The system for receiving an order for manufacture of a semiconductor wafer according to claim 23, wherein the information of the device manufacturing process includes information expressed with an ABC parameter, said ABC parameter comprising a maximum value A, a minimum value B and a standard deviation C of displacement between a reference line in a wafer surface and the wafer surface.

27. The system for receiving an order for manufacture of a semiconductor wafer according to claim 25, wherein the information of the device manufacturing process includes information expressed with an ABC parameter, said ABC parameter comprising a maximum value A, a minimum value B and a standard deviation C of displacement between a reference line in a wafer surface and the wafer surface.

28. The system for receiving an order for manufacture of a semiconductor wafer according to claim 23, wherein the information of the device manufacturing process includes information as for at least one process selected from a lithography process, a heat treatment process, a CMP process, and an etching process.

29. The system for receiving an order for manufacture of a semiconductor wafer according to claim 27, wherein the information of the device manufacturing process includes information as for at least one process selected from a lithography process, a heat treatment process, a CMP process, and an etching process.

30. The system for receiving an order for manufacture of a semiconductor wafer according to claim 23, wherein the customer computer returns information of a semiconductor wafer as manufactured by the selected wafer manufacturing process to a client terminal.

31. The system for receiving an order for manufacture of a semiconductor wafer according to claim 29, wherein the customer computer returns information of a semiconductor wafer as manufactured by the selected wafer manufacturing process to a client terminal.

32. The system for receiving an order for manufacture of a semiconductor wafer according to claim 30, wherein the information of the semiconductor wafer to be returned includes the ABC parameter of the semiconductor wafer to be manufactured and/or a configuration of a back surface of the semiconductor wafer, said ABC parameter comprising a maximum value A, a minimum value B and a standard deviation C of displacement of a reference line in a wafer surface and the wafer surface.

33. The system for receiving an order for manufacture of a semiconductor wafer according to claim 31, wherein the information of the semiconductor wafer to be returned includes the ABC parameter of the semiconductor wafer to be manufactured and/or a configuration of a back surface of the semiconductor wafer.

34. The system for receiving an order for manufacture of a semiconductor wafer according to claim 23, wherein analysis of the information of the device manufacturing process and selection of a wafer manufacturing process are performed using the ABC parameter of the semiconductor wafer to be manufactured and/or the configuration of the back surface of the semiconductor wafer, said ABC parameter comprising a maximum value A, a minimum value B and a standard deviation C of displacement of a reference line in a wafer surface and the wafer surface.

35. The system for receiving an order for manufacture of a semiconductor wafer according to claim 33, wherein analysis of the information of the device manufacturing process and selection of a wafer manufacturing process are performed using the ABC parameter of the semiconductor wafer to be manufactured and/or the configuration of the back surface of the semiconductor wafer.

* * * * *